Nov. 16, 1954 H. E. KNOPP ET AL 2,694,773
FIELD LIGHTING APPARATUS FOR VEHICULAR
FIELD WORKING EQUIPMENT
Filed Nov. 3, 1949 3 Sheets-Sheet 1
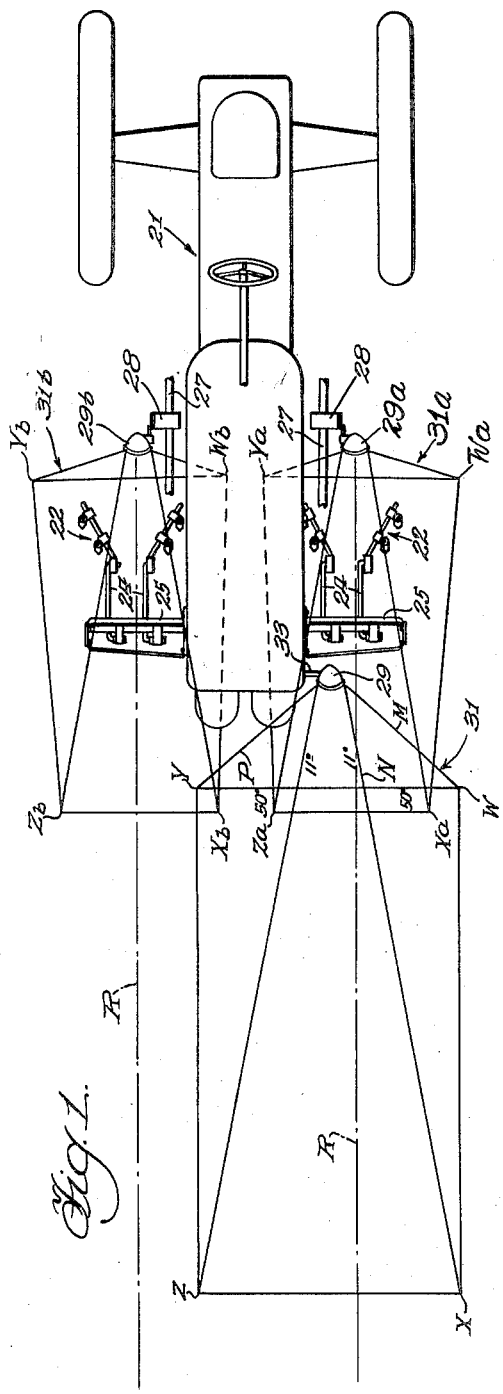
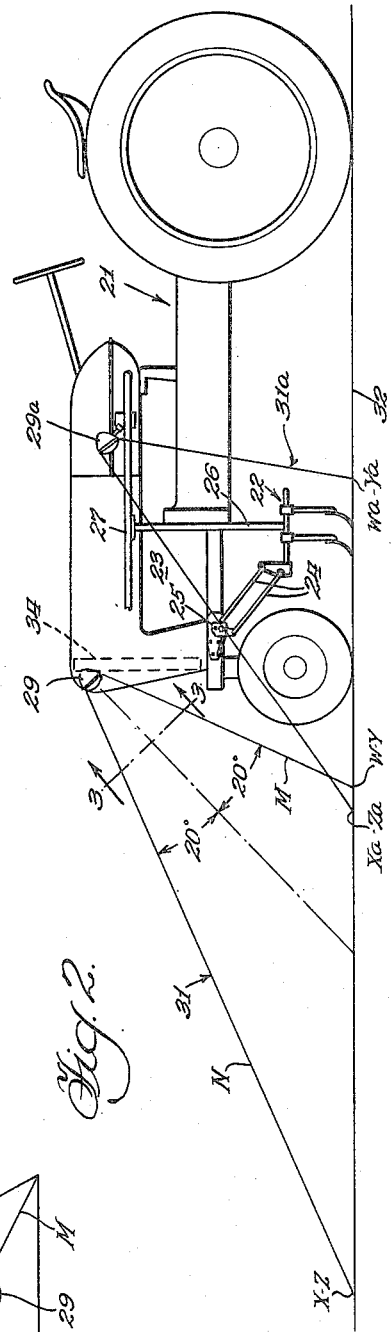
INVENTORS.
HAROLD E. KNOPP
FRANK G. MAJER

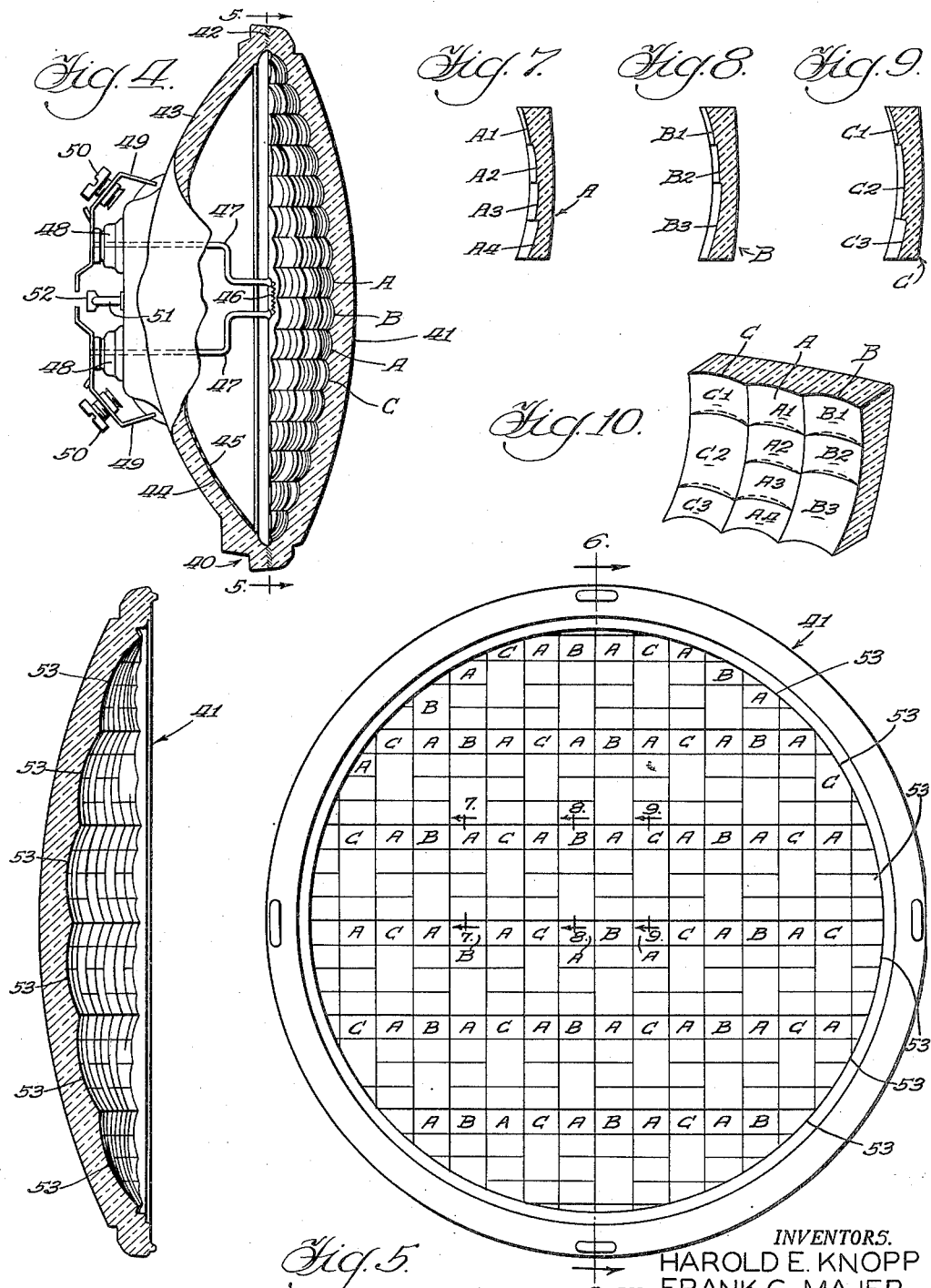

Nov. 16, 1954 H. E. KNOPP ET AL 2,694,773
FIELD LIGHTING APPARATUS FOR VEHICULAR
FIELD WORKING EQUIPMENT
Filed Nov. 3, 1949 3 Sheets-Sheet 3

INVENTORS.
HAROLD E. KNOPP
BY FRANK G. MAJER

United States Patent Office 2,694,773
Patented Nov. 16, 1954

2,694,773

FIELD LIGHTING APPARATUS FOR VEHICULAR FIELD WORKING EQUIPMENT

Harold E. Knopp, Chicago, and Frank G. Majer, Berwyn, Ill., assignors to International Harvester Company, a corporation of New Jersey Application November 3, 1949, Serial No. 125,286

6 Claims. (Cl. 240—7.1)

This invention concerns lighting systems for field-working implements and relates more particularly to a lighting system wherein a light beam projecting unit casts a beam with transverse sections of different ray intensity according to the distance the different sections are projected, so as to cause substantially uniform illumination of the ground intersecting pattern of the beam.

When headlight units of the conventional incandescent lamp type are used upon field-working implements which are tilted for casting a light beam angularly downwardly on the field there is non-uniform lighting intensity of the ground or plants intersected by different portions of the light beam. This undesirable condition prevails because the light rays in the lower part of the diverging-ray beam strike the plants or ground after projecting a shorter distance than will the rays in the upper part of such beam, and in the absence of proper correlation between ray intensity and angle of ray divergence the rays in the lower part of the beam do not spread so far as the rays adjacently to the top of the beam and produce greater illumination intensity in that part of the illuminated field pattern nearer to the headlamp than farther from it. Also, with the conventional headlamp, side edge portions of the light beam are directed onto parts of the field where they serve no useful purpose, thereby uselessly dissipating a substantial portion of available light energy.

A general object of this invention is the provision of field lighting apparatus including a headlight unit which so controls the diverging angle of light rays that these rays are caused to diverge at a greater angle in that portion of the beam which intersects the ground after being projected a shorter distance and conversely decreasing the divergence angle of the light rays in that portion of the beam which is projected a greater distance before intersecting the ground. Between these two extremes there is a gradient of light ray divergence wherefor the declining light beam will create a ground intersecting pattern of substantially rectangular formation throughout which the illumination intensity approaches uniformity.

A more specific object is the provision of a field-lighting system for vehicular field-working equipment, employing a lighting unit capable of projecting a light beam wherein a main central part is substantially regular trapeziform in transverse section with the major base of the beam disposed lowermost and which beam has a gradient of ray concentration substantially in accordance with the altitude therein from the major base, to cause uniform intensity of ground illumination when the beam is directed in a declining position.

A further object is the provision of an improved field-lighting apparatus wherein at least a pair of lighting units of the aforesaid type are arranged in tandem and so spaced from one another that the front portion of the ground intersecting pattern for the beam of the rearmost unit will somewhat overlap the rearmost portion of the ground intersecting pattern of the beam projected from the forward unit.

Still another object is the provision of an improved mounting for the lighting units, wherein at least a portion thereof is mounted upon the implement in a fashion to decline the light beam toward the ground so the illuminated portion of the field will be caused to maintain a uniform position with respect to the implement irrespective of changes in position between the tractor and the implement articulately connected therewith. Using a plurality of light-issuing units with part on the implement has the advantage over side-mounted implements of avoiding tractor-mounted units near the operator where their insect-attracting character is most annoying.

These and other desirable objects inherent in and encompassed by the invention will be more readily comprehended from the ensuing specification, the appended claims and the annexed drawings, wherein:

Fig. 1 is a plan view of field-working equipment consisting of a tractor and tillage implements together with lighting apparatus constructed in accordance with the present invention mounted thereon.

Fig. 2 is a side elevational view of the equipment and apparatus illustrated in Fig. 1.

Fig. 3 is a transverse sectional view taken on the line 3—3 of Fig. 2 illustrating the cross-sectional configuration of a light beam and its relation to a lighting unit from which it is projected.

Fig. 4 is a plan view partly in section at a horizontal plane coinciding with the principal axis of a headlight unit designed for projecting a light beam of regular trapeziform transverse section.

Fig. 5 is an enlarged rear elevational view of the lens of the lighting unit shown in Fig. 4, and taken at substantially the plane indicated by the line 5—5 in Fig. 4.

Fig. 6 is a vertical sectional view taken diametrically through the lens shown in Fig. 5, substantially on the line 6—6 of Fig. 5.

Figs. 7, 8 and 9 are vertical fragmentary sectional views taken respectively on the lines 7—7, 8—8 and 9—9 of Fig. 5, illustrating flute types A, B and C.

Fig. 10 is a perspective view of a fragment of the lens in Fig. 5 showing structural relation of adjacent flutes incorporated thereinto.

Figure 11:
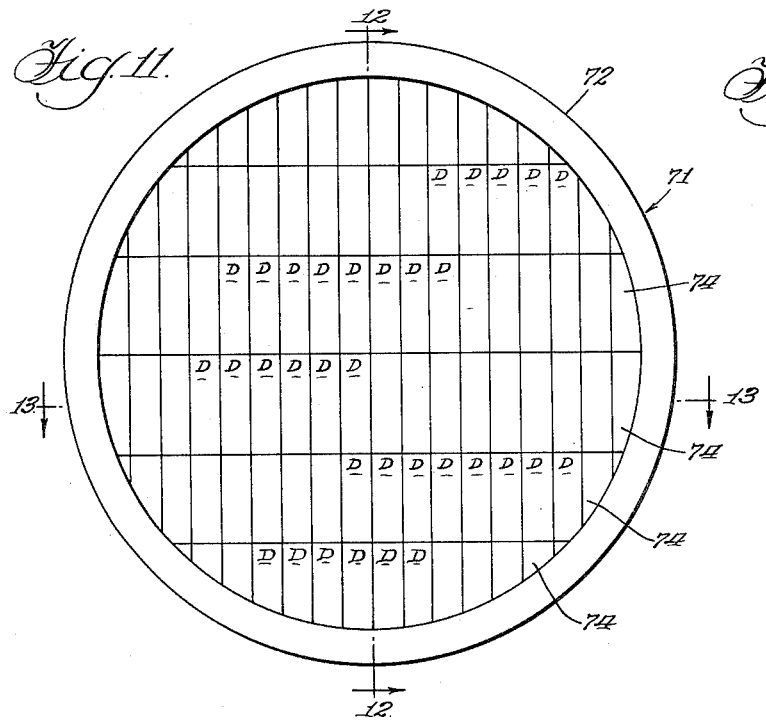

Fig. 11 is a rear elevational view of a modified form of lens cooperable with a reflector of the type shown in Fig. 4 for creating a trapeziform light ray beam.

Figure 12:
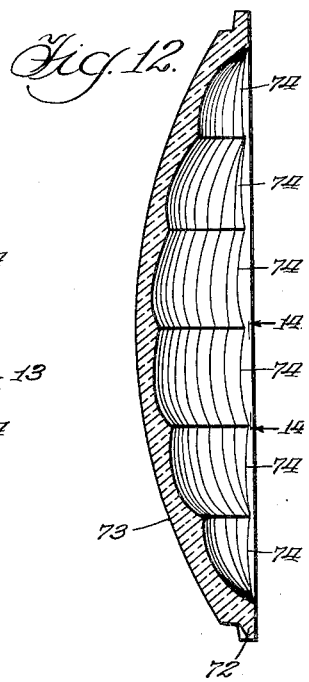

Fig. 12 is a vertical sectional view taken on the line 12—12 of Fig. 11.

Figure 13:
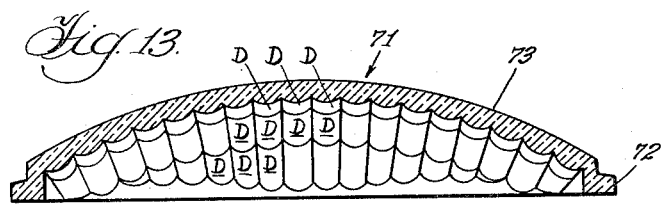

Fig. 13 is a horizontal sectional view taken on the line 13—13 of Fig. 11.

Figure 14:
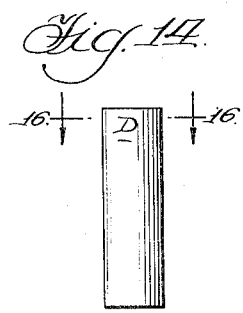

Fig. 14 is an enlarged fragmentary rear elevational view taken on the line 14—14 of Fig. 12, illustrating one of the lens fillets.

Figure 15:
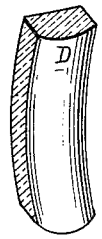

Fig. 15 is a perspective view of that portion of the lens shown in Fig. 14.

Figure 16:
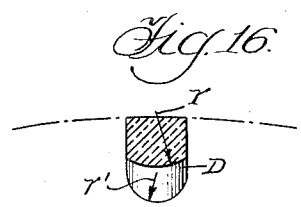

Fig. 16 is a sectional view taken on the line 16—16 of Fig. 14.

Referring now to Figs. 1 and 2, the vehicular field-working equipment there shown includes a wheel-type tractor 21 and implements 22 in the form of tool rigs disposed alongside of the tractor engine 23 at respectively opposite sides thereof and connected with the tractor by parallel link assemblies 24 and a transverse tool bar 25. Each tool rig has a vertical standard 26 secured thereto for supporting a horizontal bar 27 along which lamp mounting brackets 28 are mounted for adjustment lengthwise of the tractor. The brackets respectively carry lighting units 29a and 29b in such a manner that these units may be swung about horizontal axes to change the angularity of their light beams 31, 31a and 31b with reference to the ground surface 32. This pivotal adjustment of the lighting units 29a and 29b changes the position of the light beam patterns Wa—Xa—Ya—Za and Wb—Xb—Yb—Zb lengthwise of crop rows R. A bracket 33 secured to the left side of the tractor adjacently to the upper part of a radiator 34 pivotally supports a third lighting unit or headlamp 29 for pivotal adjustment about a horizontal axis extending transversely of the tractor so that the beam 31 of this unit can also be adjusted lengthwise of its associated crop row R. The light beam projected downwardly and forwardly from the light emitting unit on the bracket 33 has a rectangular ground pattern W—X—Y—Z.

Each of the light emitting units as 29 is constructed for projecting a light beam of inverted keystone shape, that is, having a transverse section of trapeziform, as illustrated in Fig. 3. This light beam is bounded by imaginary diverging lines M—N—O—P radiating from the unit 29. Since lighting unit 29 casts its beam 31 downwardly and forwardly, the diverging rays coinciding with the lines M and P will strike the ground at opposite ends of the line WY which is of the same length as the line XZ where the ground is struck by the light rays coinciding with the lines N and O which diverge at a lesser angle than the lines M and P. The result is a rectangular ground intersecting pattern WXYZ for the beam 31. Unit 29 is so constructed that substantially the same number of light rays are spread between the lines N and O as between the lines M and P wherefor the light ray concentration along the ground line WY will be substantially equal to the light ray concentration and ground illumination along the line XZ. This lighting unit is also constructed so that there is a gradient of light ray concentration substantially in accordance with the altitude from the major (lower) base of the trapeziform beam from unit 29. Consequently there will be substantially an equal density of light ray impingement throughout the ground area WXYZ. Units 29a and 29b are constructed similarly to unit 29 so if they were mounted to decline their beams 31a and 31b at the same angle as shown for beam 31 the patterns Wa—Xa—Ya—Za and Wb—Xb—Yb—Zb will also be rectangles.

In Figs. 4 to 10 there is illustrated a lamp unit operable to issue a light beam of regular trapeziform section as that illustrated at 31 in Figs. 1, 2 and 3. This lamp unit comprises a pre-formed glass lens 41 fusion-sealed at its periphery, as indicated at 42, to the rim of a preformed concave glass reflector section 43 to form therewith an envelope 40 of the unit.

The concave inner surface 44 of the reflector section 43 is of approximately paraboloidal shape and is covered with a coating 45 of a suitable metal, such as aluminum for instance, to form a reflecting surface. A concentrated light source or filament 46, preferably in the form of a horizontally extending linear coil of tungsten wire, is mounted within the envelope 40 at approximately the focal point of the reflecting surface 45. The filament 46 is electrically connected to and is supported in place within the envelope by lead-in wires 47 which extend through openings (not shown) in the wall of the reflector section 43 at the rear thereof and are secured at their outer ends, as by soldering for instance, to metal thimbles or ferrules 48 fusion-sealed at their rims to the exterior of the reflector section 43 around the said openings. Metal contact or terminal lugs 49 are suitably secured, as by soldering, to the closed ends of the metal thimbles 48 and are provided with terminal screws 50 for connecting the lamp unit to a suitable source of current supply. The envelope 40 is exhausted and, if desired, filled with a suitable inert gas such as argon, nitrogen, or mixtures thereof, through an exhaust tubulation 51 at the apex of the reflector section 43, which tubulation is afterwards tipped off, as indicated at 52, to hermetically seal the envelope.

As shown in Figs. 5 and 6, the lens 41 is divided into a series of horizontally extending primary flutes 53 for vertically spreading the light rays from the unit. These horizontal flutes 53 are preferably of concave shape as shown in Fig. 6 and are of relatively large size. Thus, in the particular case illustrated wherein the lens 41 is of the order of around 4½ inches in outside diameter, the flutes 53 have a vertical height of around ⅝ inch or so and are curved to a radius of the order of from around ⅜ inch to 1 inch or thereabouts.

Superimposed on each of the horizontal primary flutes 53 is a series of vertically extending secondary flutes A, B, and C for horizontally spreading the light rays from the lamp. The vertical flutes A, B, and C may be either of concave or convex shape, preferably of concave shape as shown, and are of relatively small size having, in the particular case shown, a horizontal width of around ¼ inch or so and being curved to a radius of the order of from around ³⁄₁₆ inch to ½ inch or thereabouts.

In accordance with the invention, each of the vertical flutes A, B, and C within each primary horizontal flute 53 is of progressively increasing light spread throughout its vertical extent in order to horizontally spread the resultant light beam therefrom throughout a wider angle at the bottom than at the top. For this purpose, each of the vertical flutes A, B, and C is horizontally divided into a plurality of individual flute segments A1, A2, B1, B2, C1, C2, etc., of successively increased horizontal light spread. In the particular form of lens shown in Figs. 5–10 wherein the horizontal primary flutes 53 are of concave shape, the individual flute segments A1, A2, etc. within each vertical secondary flute A, B, or C are of successively increased light spread from top to bottom of the vertical flute. The following table sets forth the horizontal light spread of the various flute segments A1, A2, etc. within each of the vertical flutes A, B, and C.

| Flute Segment | Horizontal Light Spread, degrees |
|---|---|
| A1, B1, C1 | 12 |
| A2, B2, C2 | 18 |
| A3, B3 | 24 |
| A4, C3 | 32 |

It will be observed that flute A is horizontally divided into four individual flute segments A1, A2, etc. of more or less equivalent vertical extent while flutes B and C are divided into only three individual flute segments B1, B2, B3 and C1, C2, C3, with segments B3 and C2 of approximately twice the vertical extent of the other flute segments in each flute B and C. This difference in the construction of the flutes A, B, and C is for the purpose of obtaining greater uniformity in the distribution of the light throughout the beam pattern and to avoid dark spots therein.

Because of the progressively increasing horizontal spread of the various vertical flutes, A, B, and C, the pattern of the resultant light beam from each of these secondary flutes is therefore of more or less inverted keystone shape as shown in Fig. 3. The final beam produced by the lamp as a whole is the cumulative effect of the superimposed individual light beams from the various vertical flutes A, B, and C, each individual beam being of a size corresponding to that of the final beam from the lamp.

The embodiment of lens structure illustrated in Figs. 11 through 16 comprises a symmetrical concavo-convex circular lens 71 drawn substantially to scale and having a diameter of 4¾" measuring from the outer periphery of a flange 72 thereof.

This form of lens has a smooth convex front face 73. The rear face of the lens is traversed by a plurality of relatively broad horizontal flutes 74 for spreading the light rays vertically. Flutes 74 are traversed by a plurality of fillets D for spreading the rays of the light beam horizontally. In Figs. 14, 15 and 16 it can be seen that the horizontal curvature of the fillets D is graduated so as to decrease from a relatively long radius "r" at their upper ends to a shorter radius "r'" at their lower ends to cause the light to be spread horizontally at a wider angle near the lower ends of these fillets than adjacently to the upper ends thereof. Consequently each of the fillets D causes the light rays passing therethrough to be projected forwardly in diverging fashion as a beam of inverted keystone or regular trapeziform cross section. These individual fillets are so arranged that the individual beams cast thereby are superposed in substantially centered registration at the distance from the lens to the geometric center of the ground illumination pattern which the unit is designed to produce. Consequently secondary beams cast respectively through the fillets D cumulatively produce an inverted keystone sectioned composite beam resembling the shape illustrated in Fig. 3 and, of course, having the combined illumination intensity of all of the secondary beams.

Having thus described a preferred embodiment of the invention with the view of clearly and concisely illustrating the same, we claim:

1. Field lighting apparatus for vehicular field-working equipment, comprising a beam casting lighting unit including a concave reflector adapted to reflect light rays horizontally forwardly thereof in substantial parallelism from a light source at a focal point of such reflector, and a lens disposed in a plane transverse to the parallel rays within the open end of the reflector and having individual segments intersected upon rear faces thereof by respective groups of said parallel rays, the rear faces of said segments being concavely curved from the top to the bottom thereof to diverge the light rays vertically, said rear faces of the segments also being arched horizontally and the radius of such arching being graduated from the top to the bottom of said faces to produce wider divergence of the light rays horizontally at the bottom of said segments than at the top thereof, said lens segments being focused substantially upon a common plane disposed transversely of the principal axis of the lens at a predetermined position forwardly thereof whereby the transverse patterns of the light ray beams directed forwardly through said segments when superposed at said plane form a composite transverse beam section for the entire lens of substantially inverted keystone outline; a means for mounting the unit on the equipment in a tilted position tilting the composite beam with its lower portion lowermost and at an angle causing the rays in said upper and lower portions of said composite beam to have substantially equal transverse horizontal spread at a common ground level.

2. The combination set forth in claim 1 wherein there is a second of said units, and means for mounting the second unit on the equipment in tandem with the first unit and in a position correspondingly declining the light beam and at such distance from the first unit that the ground intersecting pattern of the second unit beam partially overlaps that of the first unit beam.

3. Field lighting apparatus for vehicular field-working equipment, comprising a beam casting lighting unit including a concave reflector adapted to reflect light rays horizontally forwardly thereof in substantial parallelism from a light source at a focal point of such reflector, and a lens disposed in a plane transverse to the parallel rays within the open end of the reflector and having individual segments intersected upon rear faces thereof by respective groups of said parallel rays, the thickness of said lens segments between said rear faces and opposite forward faces thereof being graduated to be less at a center portion of said segments than at upper and lower edges thereof to diverge the parallel light rays vertically as they emerge from the forward faces, said segments also having a thickness gradient between the rear and forward faces thereof that varies symmetrically in opposite horizontal directions from a vertical median line for each of said segments, and said gradient being more pronounced adjacent the lower edges of said segments than adjacent the upper edges thereof to cause wider horizontal divergence of the rays as they emerge from the lower front face portions of the segments than the rays emerging from the upper front face portions, said lens segments being focused substantially upon a common plane disposed transversely of the principal axis of the lens at a predetermined position forwardly thereof to form a composite light beam having a main central part which is substantially regular trapeziform in transverse section at said plane and having a gradient of ray concentration substantially in accordance with altitude from the major base; and means for mounting the unit on the equipment in a position declining the beam with its major base lowermost and at an angle causing the rays along the major and minor bases to have a substantially equal spread transversely and horizontally of the beam at a common ground level.

4. The combination set forth in claim 3, wherein there is a second of said units, and means for mounting the second unit on the equipment in tandem with the first unit and in a position correspondingly declining the light beam and at such distance from the first unit that the ground interesecting pattern of the second unit beam partially overlaps that of the first unit beam.

5. Field lighting apparatus for a tractor and a field-working implement, means for articulately hitching the implement to the tractor to accommodate relative movement therebetween attendant to traversal of unlevel terrain, a beam casting lighting unit including a concave reflector adapted to reflect light rays forwardly thereof in substantial parallelism from a light source at a focal point of such reflector, and a lens disposed in a plane transverse to the parallel rays within the open end of the reflector and having individual segments intersected upon rear faces thereof by respective groups of said parallel rays, the thickness of said lens segments between said rear faces and opposite forward faces thereof being graduated to be less at a center portion of said segments than at upper and lower edges thereof to diverge the parallel light rays vertically as they emerge from the forward faces, said segments also having a thickness gradient between the rear and forward faces thereof that varies symmetrically in opposite horizontal directions from a vertical median line for each of said segments, and said gradient being more pronounced adjacent the lower edges of said segments than adjacent the upper edges thereof to cause wider horizontal divergence of the rays as they emerge from the lower front face portions of the segments than the rays emerging from the upper front face portions, said lens segments being focused to form a composite beam which when cast horizontally is relatively narrower transversely in its upper portion than in its lower portion at common vertical transverse planes spaced lengthwise of such beam and which possesses a ray concentration which diminishes substantially uniformly from the narrow upper portion to the lower portion; and means for mounting the unit on the implement in a tilted position declining the beam with its lower portion lowermost and at an angle causing the rays in said upper and lower portions to have a substantially equal transverse horizontal spread at a common ground level.

6. The combination set forth in claim 5 wherein the implement is mounted beside the tractor and the unit is mounted to project its beam forwardly and downwardly, and wherein there is a second of said units, and a second means for mounting the second unit on the tractor ahead of and in tandem with the first unit, and the second mounting means being adapted to retain the second unit in position for declining its light beam correspondingly to the declination of the first unit and at such a distance forwardly of the first unit that a rear portion of the ground intersecting pattern of the second unit overlaps a front portion of the ground intersecting pattern of the first unit.

References Cited in the file of this patent

UNITED STATES PATENTS

| Number | Name | Date |
|---|---|---|
| 1,227,778 | Gilson | May 29, 1917 |
| 1,399,749 | Conklin | Dec. 13, 1921 |
| 1,459,268 | Smith | June 19, 1923 |
| 1,686,543 | Wood | Oct. 9, 1928 |
| 1,724,757 | Frey | Aug. 13, 1929 |
| 2,154,842 | Glenn | Apr. 18, 1939 |
| 2,170,682 | Frech et al. | Aug. 22, 1939 |
| 2,304,365 | McCormick | Dec. 8, 1942 |
| 2,568,494 | Geissbuhler | Sept. 18, 1951 |